United States Patent [19]
Cardon et al.

[11] 3,873,982
[45] Mar. 25, 1975

[54] TALKING DIRECTION FINDER

[75] Inventors: Jules Cardon, Dix Hills; Frederick Richter, Huntington Station; Henry Hagedorn, Hicksville, all of N.Y.

[73] Assignee: Servo Corporation of America, Hicksville, N.Y.

[22] Filed: May 29, 1973

[21] Appl. No.: 364,828

[52] U.S. Cl.................. 343/100 CS, 340/27 NA, 343/112 TC, 323/117 R
[51] Int. Cl................................................ G08g 5/00
[58] Field of Search........ 343/113 R, 117 A, 117 R, 343/100 CS, 112 TC; 340/27 NA; 346/8

[56] References Cited
UNITED STATES PATENTS
2,774,966  12/1956  Granqvist...................... 343/106 R
3,096,513   7/1963  Cutler........................... 343/100 CS

*Primary Examiner*—Maynard R. Wilbur
*Assistant Examiner*—Richard E. Berger
*Attorney, Agent, or Firm*—Kane, Dalsimer, Kane, Sullivan and Kurucz

[57] ABSTRACT

An automated direction finder system for providing verbal bearing information for aircraft is disclosed. The system extracts data regarding the bearing of an aircraft from the radio transmission requesting the bearing and then utilizes the extracted data to control the gating between a storage drum having recorded therein a full range of possible bearings and an amplifier which amplifies the appropriate bearing of the aircraft and transmits the same back to the aircraft.

6 Claims, 1 Drawing Figure

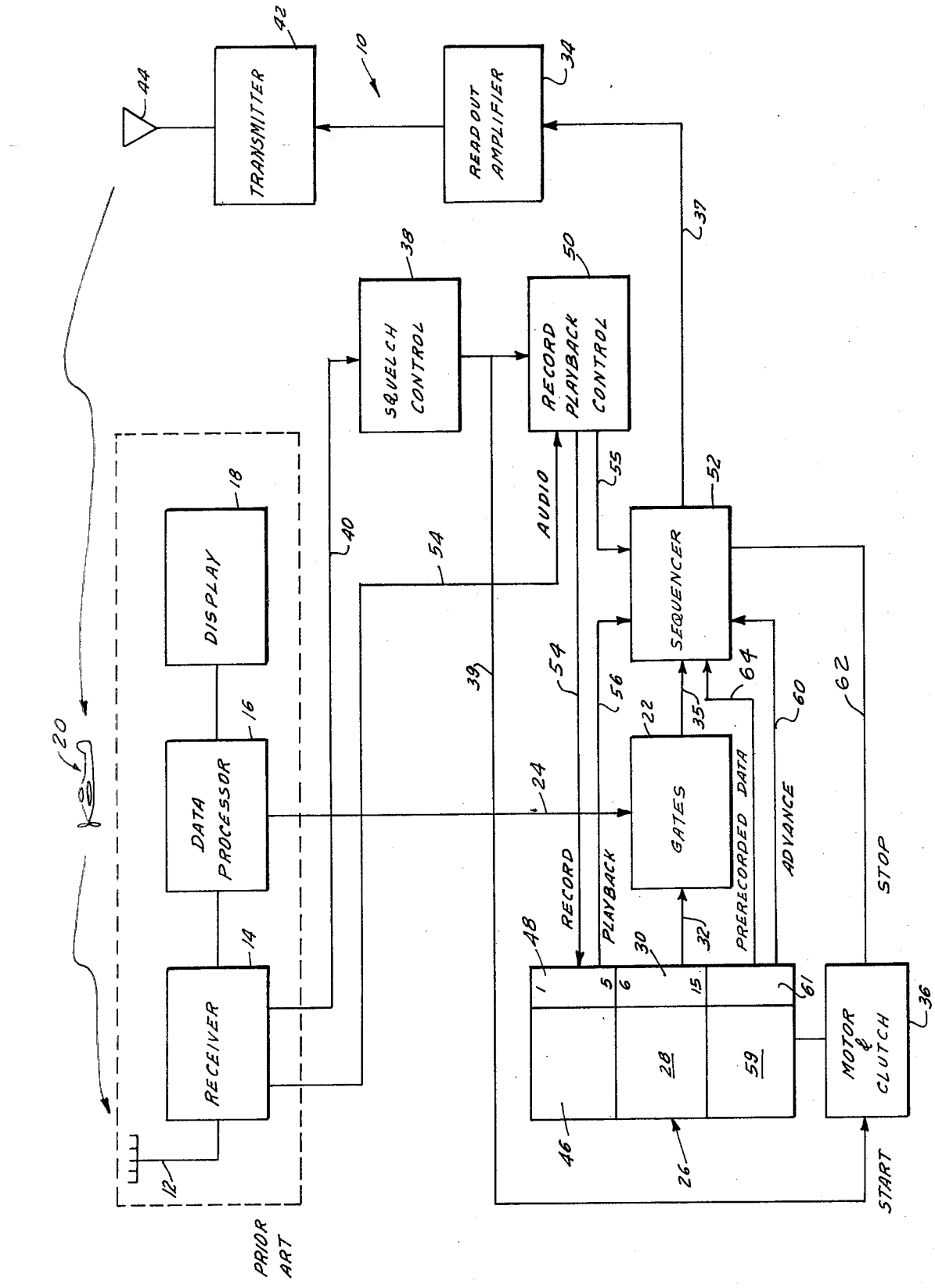

TALKING DIRECTION FINDER

BACKGROUND OF THE INVENTION

The present invention relates to a direction finder system expecially adapted for use at manned or unmanned flight service stations. In its broadest aspect, the present invention gives rise to a fully automatic direction finder system.

At present, a pilot desiring or requiring a direction finder steer radios the nearest flight service station possessing direction finder (D/F) capabilities and requests the steer. At the flight service station, equipment such as the SERVOFLIGHT Doppler direction finder system (produced by the Servo Corporation of America of Hicksville, New York) is utilized to transform the radio request for a steer to a visual indication of the aircraft's azimuth bearing. The information is read by the station operator who then radios the required information back to the aircraft.

The D/F service is thus only available to the pilot during the hours an operator is present at the station. During off-hours there is no way for the pilot to obtain the necessary bearing.

A principal object of the present invention is to provide a fully automated D/F system which automatically responds verbally to each request for a D/F steer regardless of whether or not the flight service station is manned at the time of the request.

SUMMARY OF THE INVENTION

The above and other beneficial objects and advantages are attained in accordance with the present invention which relates to an automatic system for providing a bearing in response to an RF signal request for direction finder information. The system includes an antenna array adapted to receive the RF request, receiver means connected to the antenna including means therein to detect bearing information contained in the radio request, and a data processor connected to the receiver and adapted to encode the bearing information and generate an output signal which is a digital representation of the bearing information. The system further comprises storage means containing therein pre-recorded, digital information reproducible in verbal form and encompassing a full range of possible bearings and readout means connected to the storage means to reproduce in verbal form the digital information of the storage means. Gate means are interposed between the storage means and readout and means are further provided for connecting the data processor in gate control relationship with the gate means whereby the encoded bearing information is used to selectively feed digital information from the storage to the readout corresponding to the desired bearing. The readout comprises a voice amplifier which is connected to a transmitter to transmit the requested information to the aircraft.

BRIEF DESCRIPTION OF THE DRAWINGS

The accompanying drawing is a block diagram representation of the talking direction finder system of the present invention.

DETAILED DESCRIPTION OF THE PREFERRED EMBODIMENT

Reference is now made to the associated drawing wherein the present talking direction finder system 10 is depicted. As shown, the system includes an antenna 12, receiver 14 and data processor 16. These components, in combination with a display 18 comprise the prior art direction finder systems such as the previously mentioned SERVOFLIGHT system of the Servo Corporation of America.

In brief, the prior art system employs a mult-element antenna 12, the elements of which are sequentially sampled in order to phase modulate the incoming radio transmission received from aircraft 20 requesting a bearing. The prior art system further includes a multichannel receiver 14 which amplifies, filters and detects the phase modulation envelope of the RF signal which contains the bearing information. This information is fed to a data processor where the phase of the modulation is compared to the system reference thereby providing the azimuth angle of arrival of the received signal. This information which is in analog form is then digitalized by converting it into a signal representative of a binary coded decimal which is used to drive a display 18. The display gives a visual representation of the bearing angle to the nearest degree which is a three digit number. As stated, heretofore it was necessary for an operator to read the display and then transmit the information back to the aircraft. In accordance with the invention, this is done automatically in the manner set forth below.

In accordance with the present invention, when the request for a D/F steer is received, the D/F azimuth data is extracted from the request by the receiver 14 and data processor 16 as before. This information in addition to operating display 18, which now is an optional piece of equipment, is utilized to control a series of logic gates 22 through an appropriate multiconductor connector 24. The gates 22, in turn, are connected to a multi-track record/playback type device 26 which indludes a storage drum having prerecorded tracks 28 containing voice recorded digits from 0 to 9. Each of the 10 tracks 28 has associated therewith a playback head 30 which simultaneously reads the recorded signal on each of the tracks. Each of the signals is then fed through multi-conductor lead 32 to the input to gates 22. The gates are controlled by the output of the data processor 16 so that only the signal on the tracks with the required bearing information is passed to a readout device in the form of speech amplifier 34.

The 10 tracks must be "read" 3 times to obtain all three digits of the bearing requiring three revolutions of the storage drum. With each revolution of the storage drum, the appropriate digit is transferred from the storage drum via the appropriate gate activated by the data processor. The storage drum 26 is driven by a motor and clutch arrangement 36 which, in turn, is activated through line 39 by enabler 38 which takes the form of a conventional squelch circuit connected to receiver 14 through line 40. When the enabler 38 determines that the pilot has completed transmission, it initiates transfer of record to playback mode of the storage drum in a manner to be described forthwith. Simultaneously, the data processor output, which is a digital coded representation of the desired bearing to the nearest degree is used to control logic gates 22 so that for each digit of the bearing only the track containing the recording of that digit is fed to readout 34 through conductors 35 and 37. The speech output of readout 34 is then transmitted to plane 20 through transmitter 42 and antenna 44.

Since the information to the plane is supplied automatically, it is important that the pilot of the plane requesting information be sure that a transmission he receives from the flight service station is in response to his specific request. Accordingly, the present system contemplates that storage drum 26 be provided with a number of record/playback tracks 46, as for example 5, in addition to the 10 tracks 28 containing the prerecorded bearing information. Further, the system includes record/playback heads 48 associated with each of the five additional tracks as well as means 50 for switching between the record and playback modes and a sequence control in the form of a stepping switch or its electronic equivalent to insure the proper sequence of operation.

Accordingly, when a pilot radios for a fix, the squelch control (enabler 38) detects this transmission and starts the storage drum 26 rotating by activating motor 36 through line 37. It also switches the heads 48 for tracks 46 to their record mode so that the request is recorded from receiver 14 onto the tracks through line 54. In this regard, the five additional tracks may have end indication thereon to enable sequential switching between the five tracks while in the record mode. The enabler 38 keeps the system in the record mode until the pilot completes transmission even if the length of the transmission exceeds the recording time for the five tracks. If the pilot's transmission time extends beyond the recording time for the five tracks, a part of the pilot's transmission will be lost. The squelch control also senses when the pilot completes transmission at which time it activates the record/playback control 50 to swith the record/playback heads 48 to their playback mode and initiates operation of sequence control 52 through line 55. The sequencer 52 then first causes a playback of the pilot's request for a D/F steer by sequentially connecting the output of the heads 48 associated with tracks 46 to the readout through lines 56 and 37. Thereafter the bearing information is gated to the readout by simultaneously going through tracks 28 three times in the manner previously described.

In a successful practice of the present invention, the sequencer 52 was in the form of a 12-position, multipole electronic switch which was driven to position 1 when the receiver squelch (enabler 38) was reset by a completion of transmission. Thereafter, each successive rotation of the storage drum was used to advance the switch through line 60. The positions of the switch first served to sequentially connect the heads 48 associated with tracks 46 directly to readout 34 through line 56 and 37, until the pilot's request for information was played back. With the next three advances of the switch, the prerecorded tracks containing verbal digital information were routed to gates 22 through multiconductors 32 and the output of the gates was fed on line 35 and 37 to readout 34. The next advances of the switch were used to read and connect to the readout additional prerecorded information 59 on the storage drum such as station identification, weather, overhead pass information, etc. through heads 61 and lines 60 and 37. The final position served to shut down the equipment through line 62 until the next transmission and subsequent squelch reset started the process over again.

Thus, in accordance with the above, the aforementioned objective of the present invention is effectively attained.

We claim:

1. In a system for providing a direction finder bearing in response to a radio request for such bearing of the type including processor means to extract bearing information from a radio transmission and generate a digitalized output signal representative of said information the improvement comprising: storage means comprising a first plurality of tracks containing theron prerecorded verbal digits and a second plurality of tracks, playback means operatively associated with said storage means to produce output electrical signals representative of said verbal digits, speech amplifier means adapted to convert said electrical signals into verbal reproductions of said prerecorded digits connected to said playback output through gate means, gate means interposed between said playback means and said amplifier means, means connecting said processor output in gate control relationship with said gate means, record/playback means associated with said second plurality of tracks, means for switching said record/playback means to their record mode when said radio transmission begins and to their playback mode when said radio transmission ends.

2. The system in accordance with claim 1, further comprising radio transmitter means connected to the output of amplifier.

3. The system in accordance with claim 1, wherein each of said tracks of said first plurality has prerecorded thereon a single digit 0 through 9, said playback means includes a playback head associated with each of said tracks, and the output of each of said heads comprises an input to said gate.

4. The system in accordance with claim 1, wherein said storage means includes drive means and further comprising squelch control circuit means adapted to detect the completion of said radio transmission in control relationship with said drive means.

5. The system in accordance with claim 1, wherein said switching means includes a squelch control circuit adapted to detect the beginning and end of said transmission.

6. The system in accordance with claim 1, further comprising sequential switching means in controlling relationship between (1) said playback means and playback/record means and (2) said speech amplifier.

* * * * *